(12) United States Patent
Ji et al.

(10) Patent No.: US 11,085,157 B2
(45) Date of Patent: Aug. 10, 2021

(54) FLOATABLE FLOW-RESISTING AND SAND-RESISTING MULTI-FUNCTIONAL DEVICE

(71) Applicant: JIANGSU UNIVERSITY OF SCIENCE AND TECHNOLOGY, Zhenjiang (CN)

(72) Inventors: Chunyan Ji, Zhenjiang (CN); Jianting Guo, Zhenjiang (CN); Yong Cheng, Zhenjiang (CN); Fali Huo, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 17/104,870

(22) Filed: Nov. 25, 2020

(65) Prior Publication Data

US 2021/0079614 A1   Mar. 18, 2021

(30) Foreign Application Priority Data

Oct. 10, 2020   (CN) .......................... 202011077972.2

(51) Int. Cl.
| | |
|---|---|
| *E02B 3/04* | (2006.01) |
| *E02B 3/06* | (2006.01) |
| *B63B 21/50* | (2006.01) |
| *B63B 21/29* | (2006.01) |

(52) U.S. Cl.
CPC .............. *E02B 3/064* (2013.01); *B63B 21/50* (2013.01); *E02B 3/046* (2013.01); *B63B 21/29* (2013.01)

(58) Field of Classification Search
CPC . E02B 3/062; E02B 3/064; E02B 3/04; E02B 3/046; B63B 21/50; B63B 21/29
See application file for complete search history.

(56) References Cited

U.S. PATENT DOCUMENTS

| | | | | | |
|---|---|---|---|---|---|
| 151,858 | A | * | 6/1874 | Dean ....................... | E02B 3/062 405/27 |
| 1,969,123 | A | * | 8/1934 | Doble ....................... | E02B 3/04 405/28 |
| 3,353,361 | A | * | 11/1967 | Lloyd ..................... | E02B 3/062 405/28 |
| 3,800,543 | A | * | 4/1974 | Moore .................... | E02B 3/062 405/26 |
| 3,953,977 | A | * | 5/1976 | Kikui ..................... | A01K 61/70 405/27 |

(Continued)

*Primary Examiner* — Benjamin F Fiorello
(74) *Attorney, Agent, or Firm* — CBM Patent Consulting, LLC

(57) ABSTRACT

The present invention discloses a floatable flow-resisting and sand-resisting multi-functional device. The device includes a hollow floatable body, a flow-resisting and sand-resisting plate, a flow-resisting and sand-resisting net and a mooring system, wherein a plurality of flow-resisting and sand-resisting plates are arranged, each of the flow-resisting and sand-resisting plates is arranged perpendicular to a seabed, a top end of the flow-resisting and sand-resisting plate is fixed to the bottom of the hollow floatable body, the flow-resisting and sand-resisting net down to the seabed is mounted between every two of the flow-resisting and sand-resisting plates, one end of the mooring system is connected to the hollow floatable body, and the other end of the mooring system is fixed to the seabed.

7 Claims, 3 Drawing Sheets

(56) References Cited

U.S. PATENT DOCUMENTS

| | | | | |
|---|---|---|---|---|
| 3,971,221 | A * | 7/1976 | Greenleaf | E02B 3/04 405/26 |
| 4,136,994 | A * | 1/1979 | Fuller | F03B 13/188 405/27 |
| 4,776,724 | A * | 10/1988 | Isozaki | E02B 3/062 405/27 |
| 4,997,310 | A * | 3/1991 | Rasmussen | E02B 3/062 405/26 |
| 5,192,161 | A * | 3/1993 | Helgesson | E02B 3/062 405/26 |
| 5,429,452 | A * | 7/1995 | Frost | E02B 3/062 405/26 |
| 6,652,193 | B2 * | 11/2003 | Matsuura | B63B 39/06 114/122 |
| 7,575,396 | B2 * | 8/2009 | Cederlund | E02B 3/062 405/27 |
| 9,340,940 | B2 * | 5/2016 | Neelamani | E02B 3/062 |
| 9,556,573 | B2 * | 1/2017 | Betcher | E02B 3/062 |
| 2002/0119009 | A1 * | 8/2002 | Hilliard | E02B 3/04 405/74 |
| 2008/0022915 | A1 * | 1/2008 | Budd | E02B 9/08 114/355 |
| 2015/0330046 | A1 * | 11/2015 | Betcher | E02B 3/062 405/26 |
| 2015/0376852 | A1 * | 12/2015 | Parker, Jr. | E02B 3/04 405/16 |
| 2016/0053454 | A1 * | 2/2016 | Neelamani | E02B 3/062 405/26 |
| 2019/0112770 | A1 * | 4/2019 | Lee | E02B 3/04 |
| 2019/0145072 | A1 * | 5/2019 | Haigh | E02B 3/06 405/203 |

* cited by examiner

FLOATABLE FLOW-RESISTING AND SAND-RESISTING MULTI-FUNCTIONAL DEVICE

This application claims priority to Chinese Patent Application Ser. No. CN202011077972.2 filed on 10 Oct. 2020.

FIELD OF TECHNOLOGY

The present invention relates to an ocean engineering technology, and in particular to a floatable flow-resisting and sand-resisting multi-functional device.

BACKGROUND

With the deployment of the "maritime power" strategy, China has started to be committed to developing ocean, utilizing ocean, and protecting ocean, and meanwhile, ocean engineering has been developed rapidly. A traditional fixed ocean device is seriously limited by the depth of water and is high in manufacturing cost, resulting in the research and development of a floatable ocean device by people. In recent years, the development prospect of the floatable ocean device has changed quickly.

Seawater ecological breeding plays an important role in marine economy, making important contributions to development of the marine economy, and meanwhile, satisfying requirements of people for seafood. But most existing marine breeding areas are close to harbors, in which the depth of seawater is small, and thereby being obviously limited by the depth of water of the areas, breeding single types of seafood, conflicting with the development of offshore engineering and influencing the offshore economy development. Moreover, the breeding areas are prone to be polluted, which may influence the fish survival and leads to the reduction of economic benefits. To avoid the area limitation of the seawater ecological breeding, the seawater ecological breeding needs to be developed to open seas where the depth of water is large, but to develop and utilize the seawater ecological breeding at the open seas, sea conditions of the breeding areas need to be fully considered to solve the problems that waves may damage the breeding areas and seawater may influence cultured fishes. Beyond that, the developments of offshore scenic spots and offshore recreational facilities play a very important role in the marine economy, this requires a stable state, small fluctuation and a small current speed of the seawater of areas where the developed offshore scenic spots are located, and cleanliness of the seawater needs to be ensured, so that tourists are attracted, the economic benefits are improved, but seawater of most sea areas in the Yellow Sea and the East China Sea of China is turbid, which cannot realize development of the offshore tourist industry.

SUMMARY

Objective of the invention: the present invention aims to provide a floatable flow-resisting and sand-resisting multi-functional device, which may meet a multi-function requirement of an existing ocean engineering device.

Technical solution: a floatable flow-resisting and sand-resisting multi-functional device of the present invention includes a hollow floatable body, a flow-resisting and sand-resisting plate, a flow-resisting and sand-resisting net and a mooring system, wherein a plurality of flow-resisting and sand-resisting plates are arranged, each of the flow-resisting and sand-resisting plates is arranged perpendicular to a seabed, a top end of the flow-resisting and sand-resisting plate is fixed to the bottom of the hollow floatable body, a gap is provided between a bottom end of the flow-resisting and sand-resisting plate and the seabed, the flow-resisting and sand-resisting plate does not make contact with the seabed while the device moves, the flow-resisting and sand-resisting net down to the seabed is installed between every two of the flow-resisting and sand-resisting plates, a top end of the flow-resisting and sand-resisting net is fixed to the bottom of the hollow floatable body, a bottom end of the flow-resisting and sand-resisting net makes contact with the seabed, one end of the mooring system is connected to the hollow floatable body, and the other end of the mooring system is fixed to the seabed.

Preferably, the flow-resisting and sand-resisting plate is made of a reinforced concrete material and is in rigid connection with the bottom of the hollow floatable body, a flow-resisting and sand-resisting plane of the flow-resisting and sand-resisting plate is perpendicular to an incoming wave direction, lengths of the flow-resisting and sand-resisting plates are inconsistent, the flow-resisting and sand-resisting plates are distributed in a W shape in the incoming wave direction, and the flow-resisting and sand-resisting plates located at a direction facing waves, a direction away from the waves and a middle section are shorter. When an incoming flow makes contact with the flow-resisting and sand-resisting plate, the underwater flow-resisting and sand-resisting plate may reflect water particle energy of the incoming flow and destroy movement of a water flow water particle and sand step by step, so as to reduce a flow rate of the incoming flow, deposit the sand, and meanwhile, prevent the single flow-resisting and sand-resisting plate from having strength and fatigue problems due to too large stress. In addition, the single flow-resisting plate has a certain width.

Preferably, the flow-resisting and sand-resisting plates are arranged at equal intervals.

Preferably, the flow-resisting and sand-resisting net is made of a high polymer material, the flow-resisting and sand-resisting net sinks to the seabed by means of a mass block installed at the bottom of the flow-resisting and sand-resisting net, and a length of the flow-resisting and sand-resisting net is substantially the same as or slightly larger than a depth of the seabed. A tail end of the flow-resisting and sand-resisting net is provided with the mass block, so as to ensure flexible netting to be capable of being down to the seabed.

The flow-resisting and sand-resisting net made of the high polymer material such as high density polyethylene has good hardness and tensile strength and has good anti-salt-corrosion capacity in a seawater environment. The flow-resisting and sand-resisting net may effectively disturb motion tracks of the water particle and the sand when making contact with the incoming flow, so as to dissipate kinetic energy, be in linkage with the flow-resisting and sand-resisting plate, reduce the flow rate of the incoming flow, and deposit the sand.

Preferably, the mooring system uses an anchor chain, a steel wire rope or a high polymer material for mooring, and is fixed to the seabed by means of an anchor block. When the floatable flow-resisting and sand-resisting multi-functional device meets an incoming wave with a large period, restoring force of the mooring system may be effectively improved, motion response of the hollow floatable body is reduced, and stability of the hollow floatable body is improved.

Preferably, the hollow floatable body is made of reinforced concrete, in which a surface facing waves and a surface away from the waves are arc-shaped. The hollow floatable body is made of the reinforced concrete, having good corrosion resistance and economical efficiency on the basis of having enough strength, and meanwhile, the hollow floatable body may collide with a wave of the incoming flow and reflect wave energy, so as to reduce a height of the wave behind the floatable body and achieve a wave absorbing function. Meanwhile, the surface facing the waves and the surface away from the waves are arc-shaped and may effectively reduce influences of an overtopping wave and wave run-up on a property of the floatable flow-resisting and sand-resisting device.

In order to meet a requirement of an application area of the floatable flow-resisting and sand-resisting multi-functional device, the hollow floatable body may be precast into different shapes.

Preferably, the floatable flow-resisting and sand-resisting multi-functional device is prefabricated into an annular shape according to the application area to match a man-made fish shelter so as to be applicable to a fishery area, not only preventing and absorbing the waves to prevent a culture net cage from being damaged, but also reducing the flow rate and impact of the carried sand on movement of fishes; and the floatable flow-resisting and sand-resisting multi-functional device may be applied to an offshore scenic spot, an offshore recreational facility or a beach outside, reducing a wave height and a water flow rate in the scenic spot, the recreational facility or a beach, and meanwhile, settling the sand to ensure cleanliness of seawater in a shield area and purify a seawater environment.

Beneficial effects: compared with the prior art, the floatable flow-resisting and sand-resisting multi-functional device of the present invention achieves an effective flow-resisting and sand-resisting effect through an combined action of the flow-resisting and sand-resisting plate and the flow-resisting and sand-resisting net, and meanwhile maintains a good wave absorbing property, and the present invention may be arranged in an annular shape when being arranged, may be suitable for areas such as an aquaculture area and the offshore scenic spot, may reduce the influence of the incoming flow with a too large flow rate and the carried sand on activity of the fishes, meanwhile, ensures the cleanliness of the seawater in the shield area through sand deposition, purifies the seawater environment and has good economical benefits. Moreover, the present invention further enhances functionality of the hollow floatable body while ensuring the wave absorbing property of the hollow floatable body, adds a flow-resisting and sand-resisting function, and has a wider application range and greater flexibility.

DESCRIPTION OF THE EMBODIMENTS

The present invention is described in detail with reference to the drawings and the embodiments below.

In order to meet a functional diversification requirement of a floatable ocean device, the present invention applies a flow-resisting and sand-resisting plate and a flow-resisting and sand-resisting net to the floatable ocean device, through a viscous effect of the flow-resisting and sand-resisting net and a blocking effect of the flow-resisting and sand-resisting plate, a flow rate of an incoming flow may be effectively reduced, meanwhile, sand carried by the incoming flow may also limited by the flow-resisting and sand-resisting plate and the flow-resisting and sand-resisting net, the sand is deposited on the bottom of a hollow floatable body through reduction of the flow rate, and this arrangement may widen an application range of a traditional floatable ocean device and has better practicability.

Figure 1:
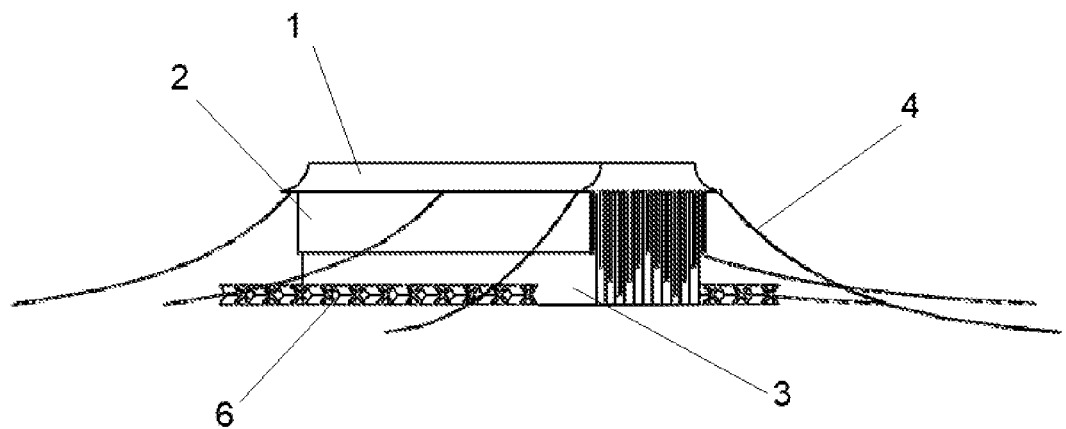
FIG. 1 is a structural space diagram of a floatable flow-resisting and sand-resisting multi-functional device of the present invention.

As shown in FIG. 1, the floatable flow-resisting and sand-resisting multi-functional device of the present invention includes the hollow floatable body, the flow-resisting and sand-resisting plate, the flow-resisting and sand-resisting net and a mooring system, wherein a plurality of flow-resisting and sand-resisting plates are arranged at equal intervals, each of the flow-resisting and sand-resisting plates is arranged perpendicular to a seabed, a top end of the flow-resisting and sand-resisting plate is fixed to the bottom of the hollow floatable body, a gap is provided between a bottom end of the flow-resisting and sand-resisting plate and the seabed, and the flow-resisting and sand-resisting plate does not make contact with the seabed while the device moves; the flow-resisting and sand-resisting net down to the seabed is installed between every two of the flow-resisting and sand-resisting plates, a top end of the flow-resisting and sand-resisting net is fixed to the bottom of the hollow floatable body, and a bottom end of the flow-resisting and sand-resisting net makes contact with the seabed; and one end of the mooring system is connected to the hollow floatable body, and the other end of the mooring system is fixed to the seabed.

The flow-resisting and sand-resisting plate is in rigid connection with the bottom of the hollow floatable body, lengths of the flow-resisting and sand-resisting plates are inconsistent, the flow-resisting and sand-resisting plates are distributed in a W shape in the incoming wave direction, the flow-resisting and sand-resisting plates located at a direction facing waves, a direction away from the waves and a middle section are shorter, and the longest flow-resisting and sand-resisting plate does not make contact with the seabed. The bottom of the flow-resisting and sand-resisting net is fixed to the seabed, and a length of the flow-resisting and sand-resisting net is substantially the same as or slightly larger than a depth of the seabed.

Figure 2:
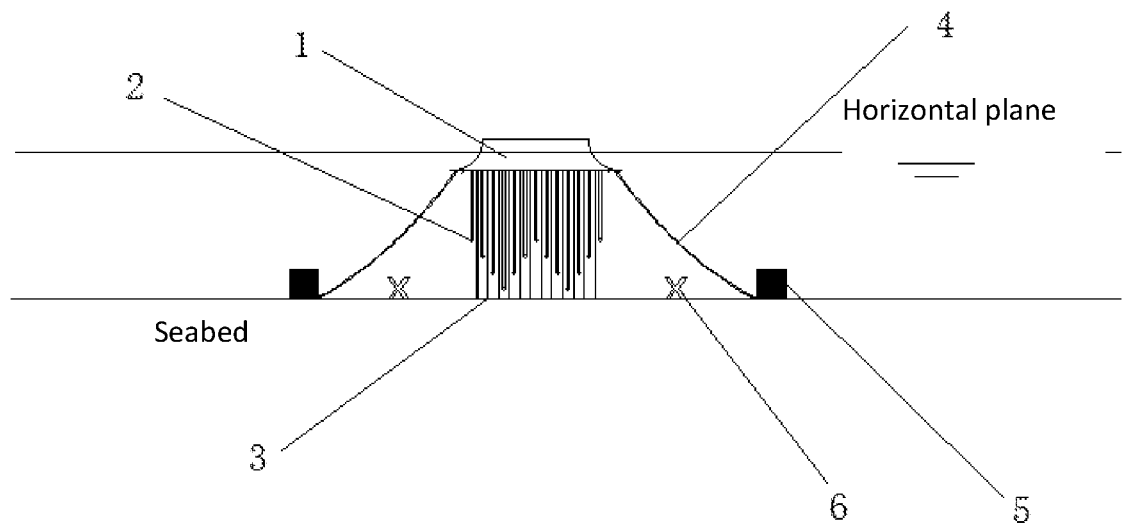
FIG. 2 is a front view of the floatable flow-resisting and sand-resisting multi-functional device of the present invention.

As shown in FIG. 2, in the embodiment, the floatable flow-resisting and sand-resisting multi-functional device uses a mooring system using an anchor chain, a steel wire rope or a high polymer material for mooring, each side of the hollow floatable body 1 is provided with the three anchor chains 4 to restrict a position of the hollow floatable body and provide enough restoring force for the hollow floatable body, and the anchor chain of a dragged section is connected to an anchor block 5 placed at the seabed by means of a mooring fastener. In order to achieve a flow-resisting and sand-resisting effect of the device, the flow-resisting and sand-resisting plates 2 arranged in a W shape and the flow-resisting and sand-resisting net 3 down to the seabed are installed at an underwater part of an bottom end of the hollow floatable body.

The hollow floatable body is made of reinforced concrete, in which a surface facing waves and a surface away from the waves are arc-shaped. When the incoming flow passes through the hollow floatable body, a part, above a horizontal plane, of the hollow floatable body makes contact with the waves to reflect kinetic energy of a water particle, so as to achieve a purpose of wave absorbing, meanwhile, the incoming flow makes contact with the underwater flow-resisting and sand-resisting plate, the flow-resisting and sand-resisting plates arranged in a W shape may effectively destroy movement of the water flow water particle and the sand, and along with increase of a length of the flow-resisting and sand-resisting plate, kinetic energy of the water flow water particle and the sand may be dissipated step by step, so that a purpose of reducing the flow rate of the incoming flow and depositing the sand is achieved, meanwhile, a reflected flow may also be subjected to a wave-absorbing and flow-resisting effect, received reverse impact force and motion response of the hollow floatable body may be assisted to be reduced, and stability of a function of the hollow floatable body is ensured.

Figure 3:
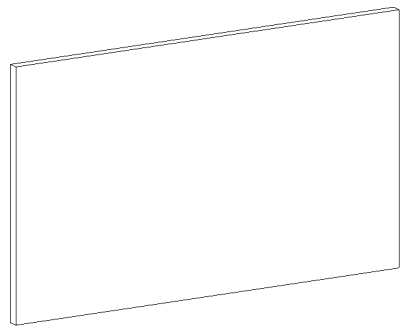
FIG. 3 is a structural schematic diagram of a flow-resisting and sand-resisting plate of the floatable flow-resisting and sand-resisting multi-functional device of the present invention.

As shown in FIG. 3, the flow-resisting and sand-resisting plate of the floatable flow-resisting and sand-resisting multi-functional device is made of a reinforced concrete material, may effectively reflect energy of a water particle of an incoming flow on the premise of ensuring a strength requirement, destroys movement of the incoming flow and the sand, reduces the flow rate, and deposits the sand.

Figure 4:
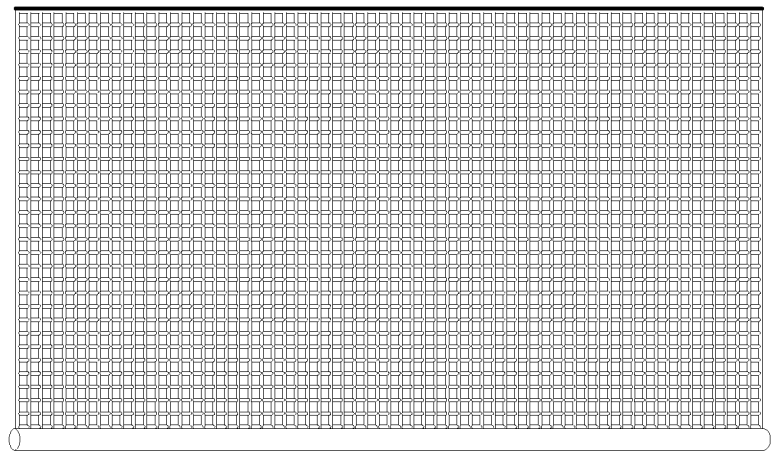
FIG. 4 is a structural schematic diagram of a flow-resisting and sand-resisting net of the floatable flow-resisting and sand-resisting multi-functional device of the present invention.

As shown in FIG. 4, the flow-resisting and sand-resisting net of the floatable flow-resisting and sand-resisting multi-functional device is made of a high polymer material such as high density polyethylene, a bottom end of the flow-resisting and sand-resisting net is flush with or a little beyond the seabed, and a main working principle of the flow-resisting and sand-resisting net is characterized in that the long enough flow-resisting and sand-resisting net may make contact with and collide with the incoming flow carrying the sand to disturb movement of a water particle and the sand, and meanwhile, by means of the viscous effect of the flow-resisting and sand-resisting net, kinetic energy of the water particle and the sand is dissipated, so that the flow rate is reduced, and the sand is deposited on the bottom of the flow-resisting and sand-resisting net. Meanwhile, the flexible flow-resisting and sand-resisting net may be effectively in linkage with the flow-resisting and sand-resisting plate, jointly dissipating the kinetic energy of the water particle and the sand, reducing the flow rate, and enabling the sand to be deposited. In the embodiment, the flow-resisting and sand-resisting net is made of the high density polyethylene, and the flow-resisting and sand-resisting net sinks to the seabed by means of a mass block installed at the bottom of the flow-resisting and sand-resisting net.

Figure 5:
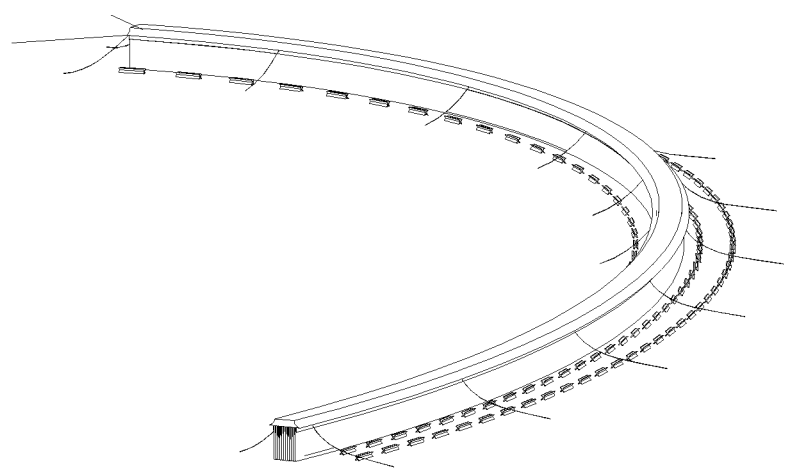
FIG. 5 is a prefabricated structure schematic diagram of an embodiment of the floatable flow-resisting and sand-resisting multi-functional device of the present invention; and in the figures: 1, hollow floatable body, 2, flow-resisting and sand-resisting plate, 3, flow-resisting and sand-resisting net, 4, anchor chain, 5, anchor block, 6, man-made fish shelter.

As shown in FIG. 5, the floatable flow-resisting and sand-resisting multi-functional device may be prefabricated into an annular shape according to an application area to match a man-made fish shelter 6 so as to be widely applicable to areas such as a fishery area, improving fishery ocean ecology, providing a better growing environment for fishes, improving economical benefits of a fishery, not only preventing and absorbing waves to prevent a culture net cage from being damaged, but also reducing the flow rate and impact of the carried sand on movement of the fishes; and the floatable flow-resisting and sand-resisting multi-functional device may be applied to an offshore scenic spot, an offshore recreational facility or a beach outside, reducing a wave height and the water flow rate in the scenic spot, the recreational facility or a beach, and meanwhile, settling the sand to ensure cleanliness of seawater in a shield area and purify a seawater environment. Meanwhile, this arrangement mode is more flexible in covering range compared with a straight-line-shaped arrangement mode.

In conclusion, the floatable flow-resisting and sand-resisting multi-functional device of the present invention includes the hollow floatable body made of the reinforced concrete, the vertical flow-resisting and sand-resisting plates with the different lengths, the flow-resisting and sand-resisting net and the mooring system, wherein the lengths of the vertical flow-resisting and sand-resisting plates are increased and the reduced in an incoming flow direction, the flow-resisting and sand-resisting plates are installed at a lower end of the hollow floatable body in a W-shaped arrangement manner, the flow-resisting and sand-resisting plate is made of the reinforced concrete material, when the incoming flow carrying the sand makes contact with the flow-resisting and sand-resisting plate, the flow-resisting and sand-resisting plate may destroy the movement of the water particle and the sand to reflect the kinetic energy of the water particle, the flow rate of the incoming flow is reduced step by step by means of the flow-resisting and sand-resisting plates arranged in a W shape, meanwhile, the single flow-resisting and sand-resisting plate is prevented from having strength destroying and fatigue damage problems due to too large stress, and reduction of the flow rate may enable the sand to be deposited below the hollow floatable body step by step. A flow-resisting and sand-resisting net structure with the same length is arranged between every two flow-resisting and sand-resisting plates, the bottom end of the flow-resisting and sand-resisting net is flush with the seabed or has a dragged part with a certain length, a body of the flow-resisting and sand-resisting net is made of a flexible material, and the flow-resisting and sand-resisting net has main functions of effectively disturbing the movement of the water particle and the sand, dissipating the kinetic energy of the water particle and the sand, reducing the flow rate, and enabling the sand to be deposited on the bottom of the hollow floatable body. The floatable flow-resisting and sand-resisting multi-functional device is connected to the seabed by means of a mooring rope. The present invention has good wave-absorbing, flow-resisting and sand-resisting properties, and the floatable flow-resisting and sand-resisting multi-functional device may be applied to a fish culture area, not only preventing and absorbing the waves to prevent the culture net cage from being damaged, but also reducing the flow rate and impact of the carried sand on movement of the fishes; and the present invention may be applied to the offshore scenic spot, the offshore recreational facility or the beach outside, reducing the wave height and the water flow rate in the scenic spot, the recreational facility or the beach, and meanwhile, settling the sand to ensure cleanliness of the seawater in the shield area and purify the seawater environment.

The floatable flow-resisting and sand-resisting multi-functional device is described in detail above, but application areas of the present invention are not only limited to the above scenes, the arrangement of the flow-resisting and sand-resisting plate and the flow-resisting and sand-resisting net is not fixed, on the premise of keeping the original working principle to be unchangeable, improvement may be achieved according to different sea conditions, different application areas and other influence factors, and all of these belong to the scope of protection of the present invention.

What is claimed is:

1. A floatable flow-resisting and sand-resisting multi-functional device, comprising a hollow floatable body, a flow-resisting and sand-resisting plate, a flow-resisting and sand-resisting net and a mooring system, wherein a plurality of flow-resisting and sand-resisting plates are arranged, each of the flow-resisting and sand-resisting plates is arranged perpendicular to a seabed, a top end of the flow-resisting and sand-resisting plate is fixed to the bottom of the hollow floatable body, a gap is provided between a bottom end of the flow-resisting and sand-resisting plate and the seabed, such that the flow-resisting and sand-resisting plate does not make contact with the seabed while the device moves, the flow-resisting and sand-resisting net down to the seabed is installed between every two of the flow-resisting and sand-resisting plates, a top end of the flow-resisting and sand-resisting net is fixed to the bottom of the hollow floatable body, a bottom end of the flow-resisting and sand-resisting net makes contact with the seabed, one end of the mooring system is connected to the hollow floatable body, and the other end of the mooring system is fixed to the seabed.

2. The floatable flow-resisting and sand-resisting multi-functional device according to claim 1, wherein the flow-resisting and sand-resisting plate is made of a reinforced concrete material and is in rigid connection with the bottom of the hollow floatable body, a flow-resisting and sand-resisting plane of the flow-resisting and sand-resisting plate is perpendicular to an incoming wave direction, lengths of the flow-resisting and sand-resisting plates are inconsistent, the flow-resisting and sand-resisting plates are distributed in a W shape in the incoming wave direction, and the flow-resisting and sand-resisting plates located at a direction facing waves, a direction away from the waves and a middle section are shorter.

3. The floatable flow-resisting and sand-resisting multi-functional device according to claim 1, wherein the flow-resisting and sand-resisting plates are arranged at equal intervals.

4. The floatable flow-resisting and sand-resisting multi-functional device according to claim 1, wherein the flow-resisting and sand-resisting net is made of a high polymer material, the flow-resisting and sand-resisting net sinks to the seabed by means of a mass block installed at the bottom of the flow-resisting and sand-resisting net, and a length of the flow-resisting and sand-resisting net is the same as or slightly larger than a depth of the seabed.

5. The floatable flow-resisting and sand-resisting multi-functional device according to claim 1, wherein the mooring system uses an anchor chain, a steel wire rope or a high polymer material for mooring, and is fixed to the seabed by means of an anchor block.

6. The floatable flow-resisting and sand-resisting multi-functional device according to claim 1, wherein the hollow floatable body is made of reinforced concrete, a surface facing waves and a surface away from the waves of the hollow floatable body being arc-shaped, or the hollow floatable body is precast into different shapes according to needs.

7. The floatable flow-resisting and sand-resisting multi-functional device according to claim 1, wherein the floatable flow-resisting and sand-resisting multi-functional device is prefabricated into an annular shape according to an application area to match a man-made fish shelter, so as to be applicable to a fishery area, an offshore scenic spot, an offshore recreational facility or a beach outside.

* * * * *